(12) United States Patent
Taulbut (10) Patent No.: US 7,245,996 B2
(45) Date of Patent: Jul. 17, 2007

(54) VEHICLE SYSTEM CALIBRATION AND VEHICLE SYSTEM CALIBRATION METHOD

(75) Inventor: Diana Katharine Taulbut, Leamington Spa (GB)

(73) Assignee: LuK Lamellen und Kupplungsbau Beteiligungs KG, Buehl (DE)

(*) Notice: Subject to any disclaimer, the term of this patent is extended or adjusted under 35 U.S.C. 154(b) by 173 days.

(21) Appl. No.: 10/494,929

(22) PCT Filed: Nov. 2, 2002

(86) PCT No.: PCT/DE02/04077

§ 371 (c)(1),
(2), (4) Date: Mar. 1, 2005

(87) PCT Pub. No.: WO03/042573

PCT Pub. Date: May 22, 2003

(65) Prior Publication Data

US 2005/0143881 A1   Jun. 30, 2005

(30) Foreign Application Priority Data

Nov. 10, 2001   (GB)   .................................. 0127067.7

(51) Int. Cl.
*G06F 17/00* (2006.01)
*G01M 17/00* (2006.01)

(52) U.S. Cl. .............................. 701/29; 701/32; 701/35
(58) Field of Classification Search .................... None
See application file for complete search history.

(56) References Cited

U.S. PATENT DOCUMENTS 5,469,363 A   11/1995   Saliga

FOREIGN PATENT DOCUMENTS

| DE | 3313481 C2 | 10/1984 |
|---|---|---|
| DE | 4128922 A1 | 3/1992 |
| DE | 19836969 A1 | 2/2000 |
| WO | WO00/72463 A2 | 11/2000 |
| WO | WO01/80146 A1 | 10/2001 |
| WO | WO01/82009 A2 | 11/2001 |

*Primary Examiner*—Michael J. Zanelli
(74) *Attorney, Agent, or Firm*—Simpson & Simpson PLLC (57) ABSTRACT

A method for calibrating a vehicle system having multiple interconnected components including an electronic control unit, the method including the attachment of an unpowered, semiconductor-based transponder unit that responds to a radio signal to each component of the system, the encoding of the transponder unit with data pertaining to the component, the excitation of the transponder unit using a radio scanner in order to read the data of the transponder unit and the writing of data into the electronic control unit after the component has been installed in the vehicle system.

11 Claims, 6 Drawing Sheets

VEHICLE SYSTEM CALIBRATION AND VEHICLE SYSTEM CALIBRATION METHOD

CROSS REFERENCE TO RELATED APPLICATIONS

The present application is the U.S. national stage application pursuant to 35 U.S.C. §371 of International Application No. PCT/DE02/04077 filed Nov. 2, 2002, which application claims benefit of United Kingdom Patent Application No. 0127067.7, filed Nov. 10, 2001.

BACKGROUND OF THE INVENTION

The present invention relates to vehicle systems, for example, an automated transmission system or an automated gear shift system for a motor vehicle.

Automated transmission systems for motor vehicles, such as in British Patents 2308413, 2354296, 2354295, 2358443, 0105186.1, 0029453.8, 0026423.4, 0025848.3, 0025847.5, 0029454.6, 0025000.1, 0024999.5, 0026178.4, 0027640.2, 0028310.1, 0031624.0, 0103312.5, whose content is expressly incorporated in the disclosure content of the present invention, include various components, for example an hydraulic pressure supply unit, a valve unit, a gear shift mechanism and an electronic control unit, which are installed in the vehicle either as original equipment or as upgrades and even as spare parts installed during maintenance of the vehicles.

In order to function correctly, the various components for the system must be calibrated, and the electronic control unit must be programmed using the important identifiers of the components. This may be performed after installation of the system in the vehicle. However, it is desirable for individual components to be pre-calibrated by means of bench tests and the identifier of each component to be entered in the control unit when the system is installed or when a component in the system is replaced.

It is also desirable for each component of the system to be identified to ensure that the correct part is installed in the system and to offer protection from imitation parts.

Bar coding of the various components of the system has previously been used for this purpose, the various bar codes being read using a scanner when the system is installed in the vehicle and the data being entered in the electronic control unit.

This method of marking the various components of the system has the disadvantage that the bar code must be visible so it is possible to scan them. This is not always possible when the system is installed in the vehicle. Moreover, it is easy for the bar codes to be covered with dirt or to detach from the components.

The present invention provides an improved method for calibrating such systems.

According to one aspect of the present invention, a method for calibrating a vehicle system comprising multiple interconnected components, among them an electronic control unit, includes the attachment to each component of the system of an unpowered, semiconductor-based electronic transponder unit that responds to a radio signal, encoding of the transponder unit with data that pertains to the component, and excitation of the transponder unit using a radio scanner to read the data from the transponder unit and write the data into the electronic control unit after the component has been installed in the vehicle system.

Using the electronic marking means according to the present invention, the radio scanner only needs to be disposed in the vicinity of the transducer in order to read the data and thereby overcomes the difficulty of reading data from unfavorably positioned components. Furthermore, the transponders may also be read, even if they are heavily soiled. Electronic, semiconductor-based transponders of the type used are also capable of storing more data than are able to be represented in a bar code.

BRIEF DESCRIPTION OF THE DRAWINGS

The invention is then described, only as an example, with reference to the accompanying drawings, of which.

DETAILED DESCRIPTION OF THE INVENTION

Figure 1:
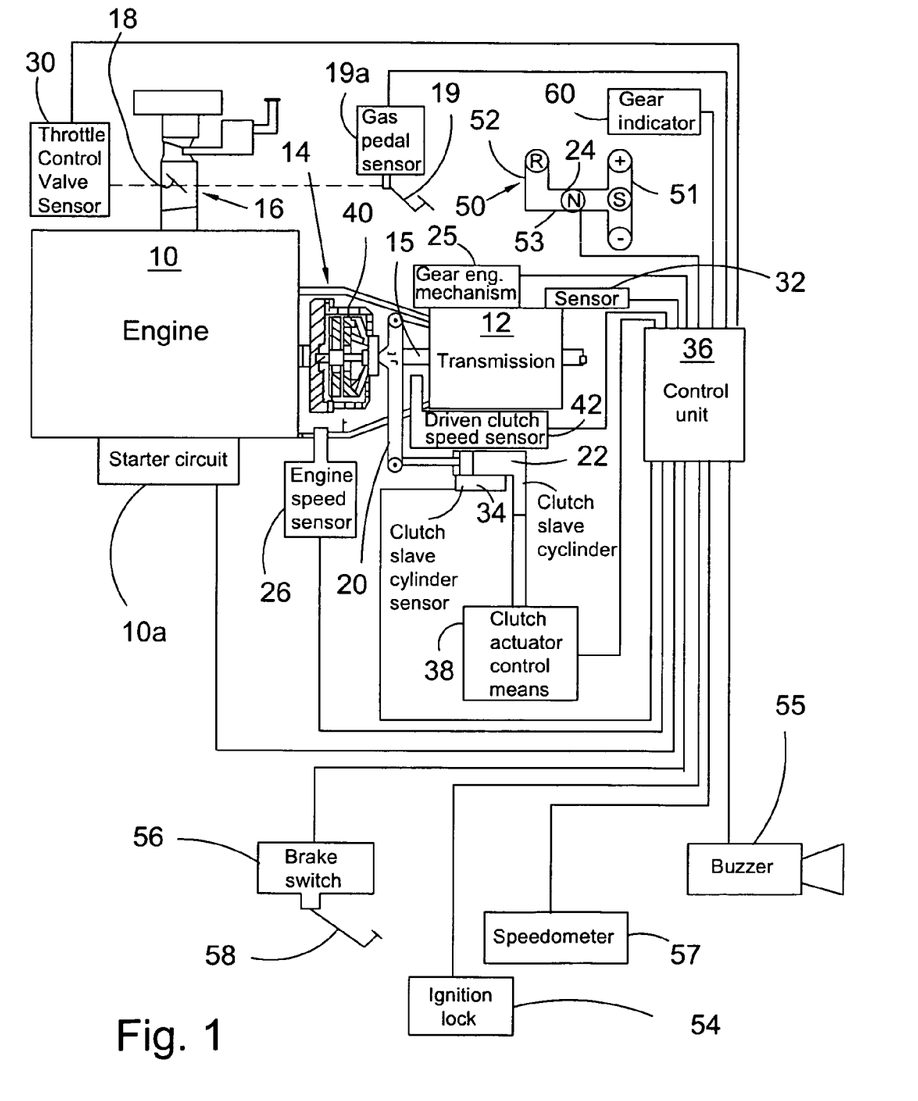
FIG. 1 diagrammatically shows a semi-automatic transmission system of a motor vehicle.

FIG. 1 of the accompanying drawings shows an engine 10 having a starter and an associated starter circuit 10a that is coupled by the main drive friction clutch 14 via a transmission shaft 15 to a multi-speed, synchronized transmission of the type having a countershaft 12. The engine is supplied with fuel via a throttle 16, the throttle including a throttle slide valve 18, that is actuated by the gas pedal 19. The invention is equally applicable for gasoline or diesel engines having electronic or mechanical fuel injection.

Clutch 14 is actuated by a release fork 20, which on its part is actuated by a hydraulic slave cylinder 22 that is controlled by the clutch actuator control means 38.

A gear selection lever 24 operates in a shift gate 50 having two legs 51 and 52 that are connected by a transverse track 53, which extends between the end of leg 52 and a position between the ends of leg 51. Control gate 50 defines five positions: "R" at the end of leg 52, "N" in the center between the ends of transverse track 53, "S" at the junction point of leg 51 and transverse track 53, and "+" and "−" at the ends of leg 51. In leg 51 lever 24 is aligned at the outset with central position "S". The "N" position of selection lever 24 corresponds to neutral; "R" corresponds to the selection of reverse gear; "S" corresponds to the selection of a forward drive mode; the brief movement of the lever into the "+" position represents a command that causes the transmission to shift up one gear step; and the brief movement of the gear selection lever 24 into the "−" position represents a command that causes the transmission to shift down one gear step.

The positions of lever 24 are detected by a series of sensors, such as microswitches or optical sensors, that are disposed around shift gate 50. The signals of the sensors are fed to an electronic control unit 36. An output of control unit 36 controls a gear engagement mechanism 25, which engages the gear ratios of transmission 12 according to the movement of selection lever 24 by the driver of the vehicle.

In addition to the signals of gear selection lever 24, control unit 36 receives signals from: Sensor 19a, which indicates the degree to which gas pedal 19 is depressed; sensor 30, which indicates the degree to which throttle control valve 18 is opened; sensor 26, which indicates the engine speed; sensor 42, which indicates the speed of the driven clutch plate; and sensor 34, which indicates the position of the clutch slave cylinder.

Control unit 36 uses the signals of these sensors to control the actuation of clutch 14 when starting out from the idle position and when changing gears, as is described, for example, in the descriptions of European patents 0038113, 0043660, 0059035 and 0101220 and WIPO patent 092/13208, whose contents are expressly incorporated in the disclosure content of the present invention.

In addition to the aforementioned sensors, control unit 36 also still receives signals from a vehicle speedometer 57, from ignition lock 54 and from brake switch 56, which is associated with the main braking system of the vehicle, for example, foot brake 58.

A buzzer 55 is connected to control unit 36 in order to warn the driver of the vehicle, or to indicate to him if certain operating conditions are occurring. In addition to or instead of buzzer 55, a flashing warning light or other display means may be used. A gear indicator 60 is also provided to indicate the selected gear.

Figure 2:
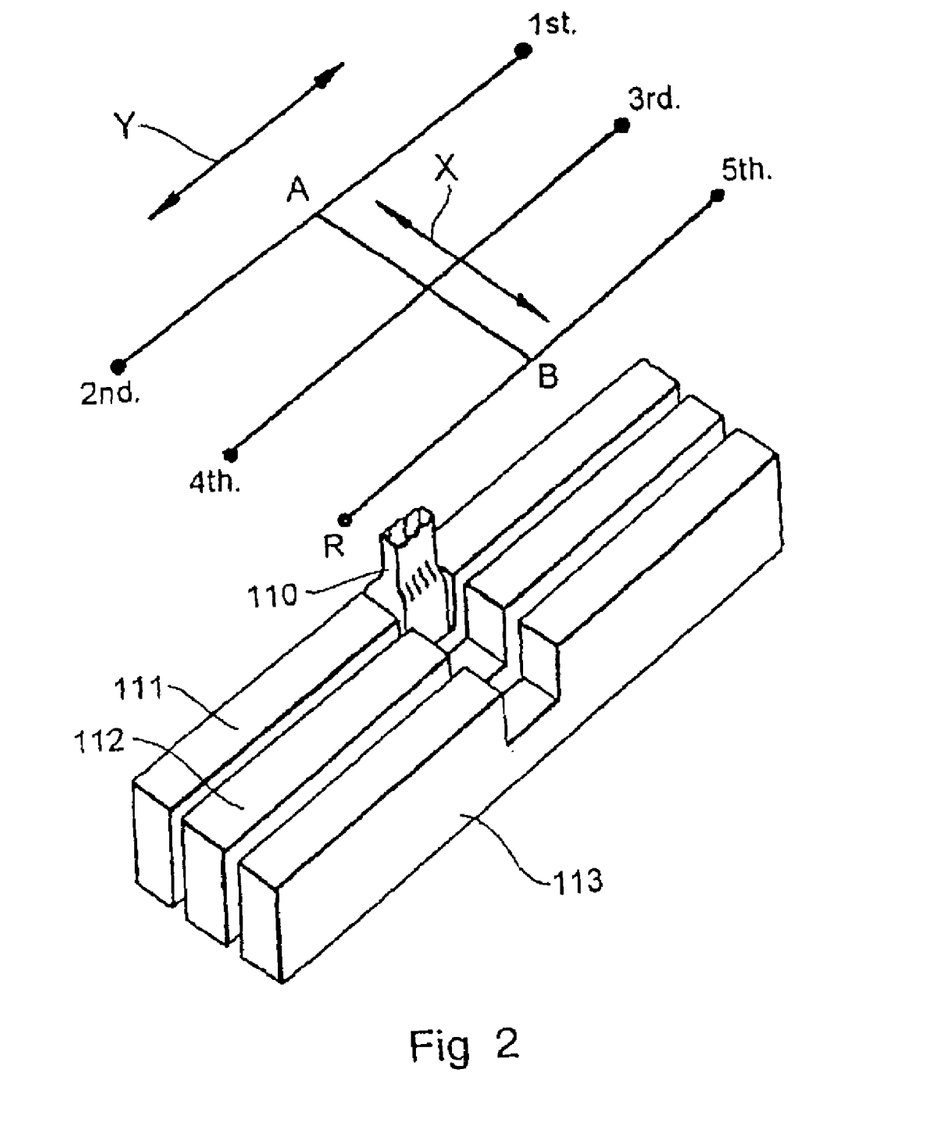
FIG. 2 shows a gear shift mechanism and the associated selection gate of the transmission system that is represented in FIG. 1.

As described in FIG. 2, the gear engagement mechanism 25 includes three shift rails 111, 112, 113 that are mounted parallel to each other for movement in an axial direction. Each shift rail 111, 112, 113 is connected in a standard way via a shift fork and a synchronizer to two of the gear ratios of transmission 12, so the movement of shift rails 111, 112, 113 in an axial direction causes the engagement of one of the gears and the axial movement of shift rails 111, 112, 113 in the opposite axial direction causes the engagement of the other gear.

Typically, first and second gear are assigned to shift rail 111, so the axial movement of shift rail 111 in a first direction engages first gear, or the axial movement of shift rail 111 in a second direction engages second gear; third and forth gears are assigned to shift rail 112, so the axial movement of shift rail 112 in a first direction engages third gear or the axial movement of shift rail 112 in a second direction engages fourth gear; and fifth gear and reverse are assigned to shift rail 113, so the axial movement of shift rail 113 in the first direction engages fifth gear, while the axial movement of shift rail 113 in the second direction engages the reverse gear.

A selection device element 110 is mounted for a movement in a select direction X transverse to the axes of shift rails 111, 112, 113 and in a shift direction Y, which represents an axial movement with respect to shift rails 111, 112, and 113. Selection device element 110 may be moved from there in a selected direction X along a neutral plane A-B, so it may be indexed with one of shift rails 111, 112 and 113 and engage in a selected shift rail. Selection device element 110 may then be moved in a shift direction Y in order to move the occupied shift rail 111, 112, 113 axially in one of the two directions to engage one of the gears that are associated with them.

Figure 3:
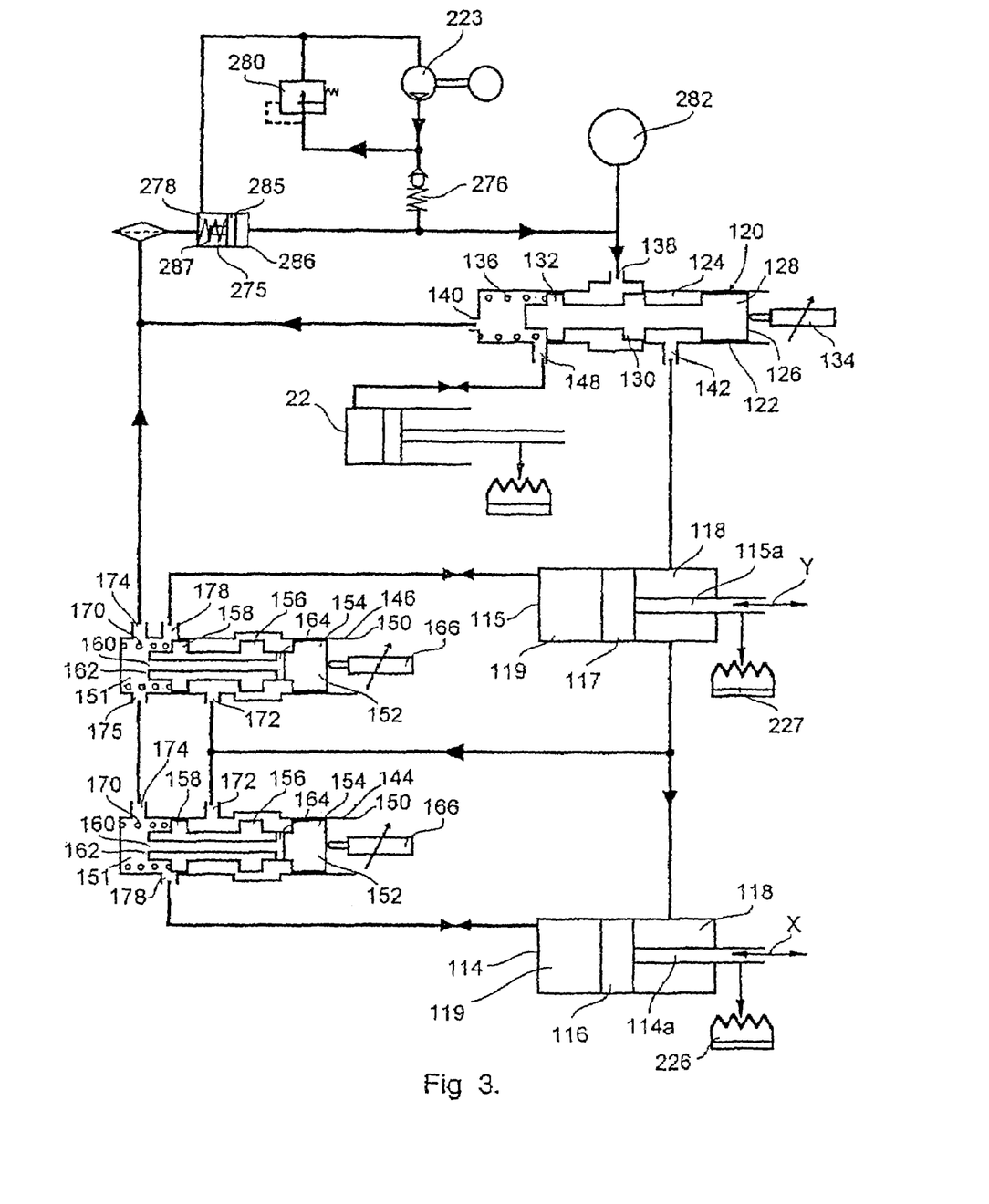
FIG. 3 diagrammatically shows the hydraulic actuation system of the transmission system represented in FIG. 1.

As illustrated in FIG. 3, selection device element 110 is movable in selected direction X by means of a first actuator 114 that is actuated by fluid pressure along neutral plane A-B, as illustrated in FIG. 2, in order to align selection device element 110 with one of shift rails 111, 112 or 113 and thereby select a gear pair that is assigned to the shift rail. Selection device element 110 may then be moved in shift direction Y by means of a fluid-pressure operated actuator 115, in order to move shift rail 111, 112 or 113 axially in one of the two directions to engage one of the gears assigned thereto.

Actuators 114 and 115 each comprise a double-acting ram with pistons 116 and 117, respectively, which divide the actuators into two working chambers 118, 119, working chambers 118, 119 being disposed on opposite sides of each piston 116, 117. Engagement rods 114a, 115a extend from one side of piston 116 and 117, respectively, and are operatively connected to selection device element 110 for movement thereof in the select and shift directions X and Y, respectively. As a result of the connection of engagement rods 114a to X and Y, the working surface of pistons 116, 117, that faces working chamber 118 is smaller than the working surface of pistons 116, 117 that faces working chamber 119.

A solenoid-controlled main control valve 120 comprises a housing 122, which defines a valve cylinder 124. A piston valve 126 is disposed within valve cylinder 124 in such a manner as to be able to slide, piston valve 126 having three axially spaced surrounding ribs 128, 130, 132 that engage the valve cylinder in such a manner as to seal it. A solenoid 134 acts at one end of piston valve 126 so that when solenoid 134 is excited, piston valve 126 moves axially within valve cylinder 124 against a load that is exerted by a compression spring 136, which on its part acts on the opposite end of piston valve 126.

An inlet 138 into valve cylinder 124 of valve 120 is connected to a spring accumulator 275. Spring accumulator 275 comprises a piston 285 that is sealed in a cylinder 286 in such a manner that it is movable. A spring 287 acts on one side of piston 285 biasing it to one end of cylinder 286. An electrically driven pump 223 is provided in order to charge accumulator 275 via a check valve 276, supplying fluid to the side of piston 285 that is away from spring 287, whereupon spring 287 is compressed and the fluid is placed under pressure. The side of piston 285 from which spring 287 acts is vented and serves as a fluid equalizing vessel 278 for the system. A pressure transducer 282 is provided between spring accumulator 275 and inlet 138 of main valve 120 in order to measure the accumulator pressure and transmit signals corresponding to the pressure to control unit 36.

An outlet 140 from valve cylinder 124 is connected to equalizing vessel 278. A first opening 142 of valve cylinder 124 is connected to working chambers 118 of select and shift actuators 114, 115 and selectively connected to working chambers 119 via select and shift valves 144, 146, and a second opening 148 is connected to clutch slave cylinder 22. A pressure relief valve 280 is provided between the outlet of pump 223 and equalizing vessel 278 in order to ensure that the pressure that is supplied by pump 223 does not exceed a maximum predetermined value.

Select and shift valves 144, 146 are both solenoid-controlled valves, each of which has a housing 150 by which a valve cylinder 151 is defined having a piston valve 152 that is installed in valve cylinder 151 such a manner as to be able to slide. Piston valve 152 has three axially spaced ribs 154, 156, 158, the ribs engaging with valve cylinder 151 in such a manner as to seal it. An axial bore 160 opens at end 162 of piston valve 152 and provides the connection to a transverse bore 164, transverse bore 164 opening between ribs 154 and 156 of piston valve 152. A solenoid 166 acts on an end 168 of piston valve 152 that is away from end 162 so that, upon excitation of solenoid 166, piston valve 152 moves axially within valve cylinder 151 against a load that is exerted by a compression spring 170, which on its part acts on end 162 of piston valve 152.

An inlet 172 of valve cylinder 151 is connected to opening 142 of main control valve 120. An outlet 174 from valve cylinder 151 is connected to equalizing vessel 278. Opening 178 of select valve 144 is connected to second working chamber 119 of select actuator 114, and opening 178 of shift valve 146 is connected to second working chamber 119 of shift actuator 115.

Figure 7:
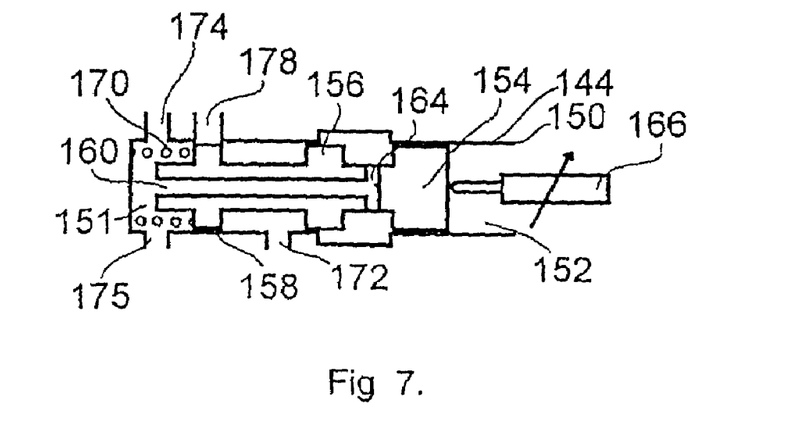
FIG. 7 shows a diagrammatic cross-sectional view of the gear shift control valve of the hydraulic actuation system represented in FIG. 3 in an excited third position.
Figure 8:
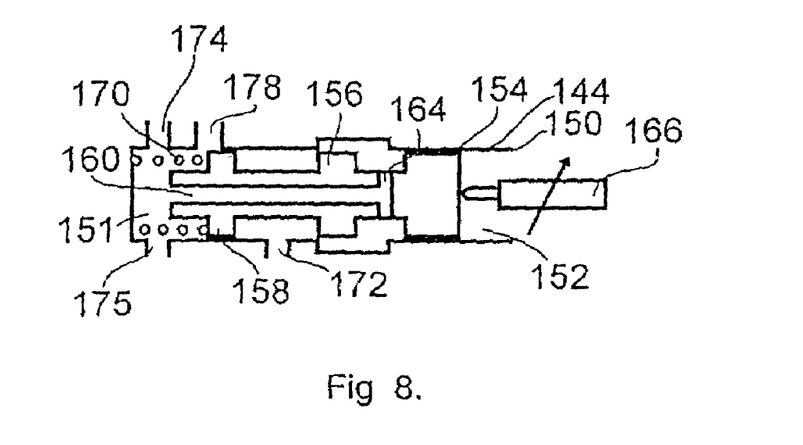
FIG. 8 shows a view similar to FIG. 7 of the gear shift control valve in an excited third position.
Figure 9:
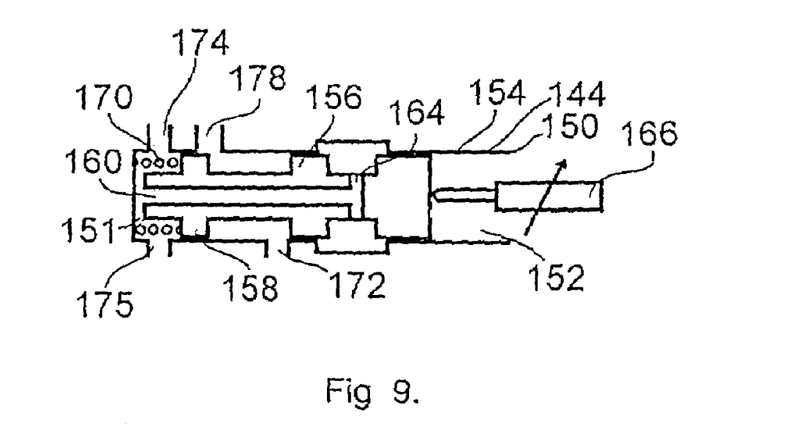
FIG. 9 shows a view similar to FIG. 7 of the gear shift control valve in an excited fourth position.

The structure and operation of valves 144 and 146 and actuator 114 and 115 are identical to that which is represented in FIGS. 7 to 9.

If the transmission is engaged in a gear and clutch 14 is engaged, solenoids 134 and 166 are not excited, and valves 120, 144 and 146 are in the idle positions that are represented in FIG. 3. In this position, clutch slave cylinder 22 is connected via opening 148 and outlet 140 of main control valve 120 to equalizing vessel 278; working chambers 118 of select and shift actuators 114, 115 are connected to equalizing vessel 278 via inlet 172, ports 164, 160 and outlet 174 of select and shift valves 144, 146; and working chambers 119 of select and shift actuators 114, 115 are connected to equalizing vessel 278 via opening 178 and outlet 174 of select and shift valves 144, 146. Consequently, there is a movement neither of clutch slave cylinder 22 nor of select and shift actuators 114, 115.

Figure 4:
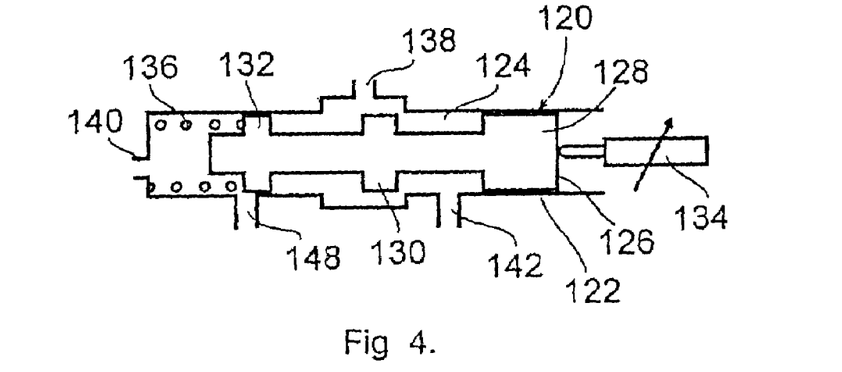
FIG. 4 shows a diagrammatic cross-sectional view of the main control valve of the hydraulic actuation system represented in FIG. 3 in an excited second position.

If a gear change is initiated, for example, by the driver of the vehicle moving gear selection lever 24 for a moment into the "+" position, or by automatic initiation, solenoid 134 is excited in order to move piston valve 126 of main control valve 120 into a second position, as illustrated in FIG. 4. In this second position, working chambers 118 of both the select and shift actuators 114, 115 and inlets 172 of both select and shift valves 144, 146 are connected to spring accumulator 275 via opening 142 and inlet 138. In this second position, clutch slave cylinder 22 is connected to equalizing vessel 278.

Simultaneously with the excitation of solenoid 134, in order to move main control valve 120 into the second position represented in FIG. 4, solenoids 166 of select and shift valves 144, 146 are excited in order to move piston valve 152 into a zero position, as represented in FIG. 7. In this second position, rib 158 of piston valve 152 closes opening 178, whereupon working chamber 119 is closed and an hydraulic lock is developed that hinders the movement of select and shift actuators 114 and 115, although working chambers 118 thereof are connected to spring accumulator 275 via main control valve 120. The connection of opening 172 to outlet 174 via valve cylinder 160 and 164 is also closed.

Figure 5:
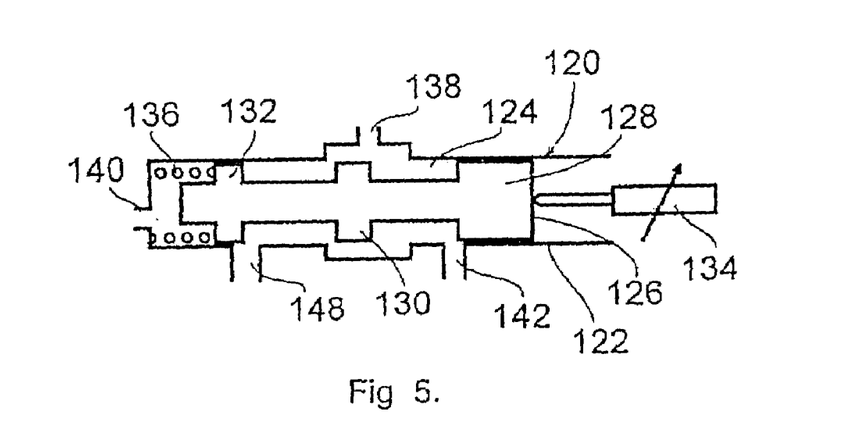
FIG. 5 shows a view similar to FIG. 4 of the main control valve in an excited third position.

Another excitation of solenoid 134 into a third position, as represented in FIG. 5, then closes the connection between the clutch slave cylinder and the equalizing vessel and opens the connection between the clutch slave cylinder and spring accumulator 275, release fork 20 being actuated to disengage clutch 14.

Figure 6:
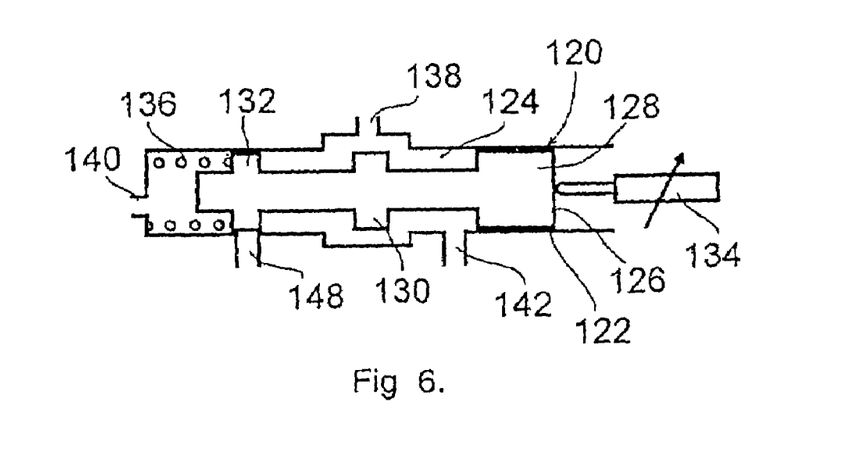
FIG. 6 shows a view similar to FIG. 4 of the main control valve in an excited fourth position.

When clutch 14 is disengaged, solenoid 134 of main control valve 120 may be excited in order to move the main control valve back into the fourth position, as illustrated in FIG. 6. In this fourth position, opening 148 is separated from inlet 138 and outlet 140, so clutch 14 is held firmly in the disengaged position. Solenoids 166 of the select and shift valves 144, 146 may then be selectively excited, select and shift valves 144, 146 being moved between the third and fourth positions in order to disengage the gear that is selected at this moment and engage a new gear.

The excitation of solenoid 166 to move select and shift valve 144, 146 into a third position, as illustrated in FIG. 8, in which working chamber 119 is connected to equalizing vessel 278 while working chamber 118 is connected to accumulator 275, creates a pressure differential across pistons 116 and 117 that causes engagement rods 114a, 115a to extend. The excitation of solenoid 166 to move select and shift valve 144, 146 into the fourth position, as represented in FIG. 9, in which both working chambers 118 and 119 are connected to spring accumulator 275, causes engagement rods 114a, 115a to retract because of the different working surfaces of pistons 116 and 117. Consequently, selection device element 110 may be moved by suitable control solenoids 166 of select and shift valves 144, 146 in order to engage the desired gear.

Potentiometers 226 and 227 are connected to engagement rods 114a or 115a, respectively, in order to provide signals that designate the position of the associated engagement rods. The signals of potentiometers 226 and 227 are fed to control unit 36 in order to provide an indication of the position of engagement rods 114a and 115a for each of the gear ratios of transmission 12 and also to designate the position of engagement rods 115a when selection device element 110 is located in neutral plane A-B from FIG. 2. The transmission system may thus be calibrated so predetermined position signals that come from potentiometers 226 and 227 correspond to the engagement of each of the gears of transmission 12.

Measurements of potentiometers 226 and 227 may therefore be used by a closed loop control system to control valves 144 and 146 in order to move engagement rods 114a and 115a to the predetermined positions to engage the desired gear.

When the desired gear has been engaged, solenoids 166 of select and shift valves 144, 146 are excited in order to move valves 144, 146 back into their zero positions, openings 178 being closed and a hydraulic locking being produced that prevents a movement of actuators 114, 115.

Solenoid 134 of main control valve 120 may then be excited in order to move main control valve 120 out of its fourth position into its second position, whereupon fluid may be conducted back from clutch slave cylinder 22 into equalizing vessel 278, which enables re-engagement of clutch 14. Main control valve 120 may be switched between the third and second position so clutch 14 is re-engaged in a controlled manner, for example, as disclosed in European patents 0038113; 0043660; 0059035; 0101220 or WIPO patent 92/13208.

When clutch 14 has been re-engaged, solenoid 134 of main control valve 120 may be de-energized, so it returns to the idle position that is illustrated in FIG. 3. Solenoids 166 of select and shift valves 144, 146 may be de-energized in a similar manner. The movement of select and shift valves 144, 146 into the idle position, which is illustrated in FIG. 3, opens working chamber 119 to equalizing vessel 278, whereupon the pressure built up therein is relieved.

Figure 10:
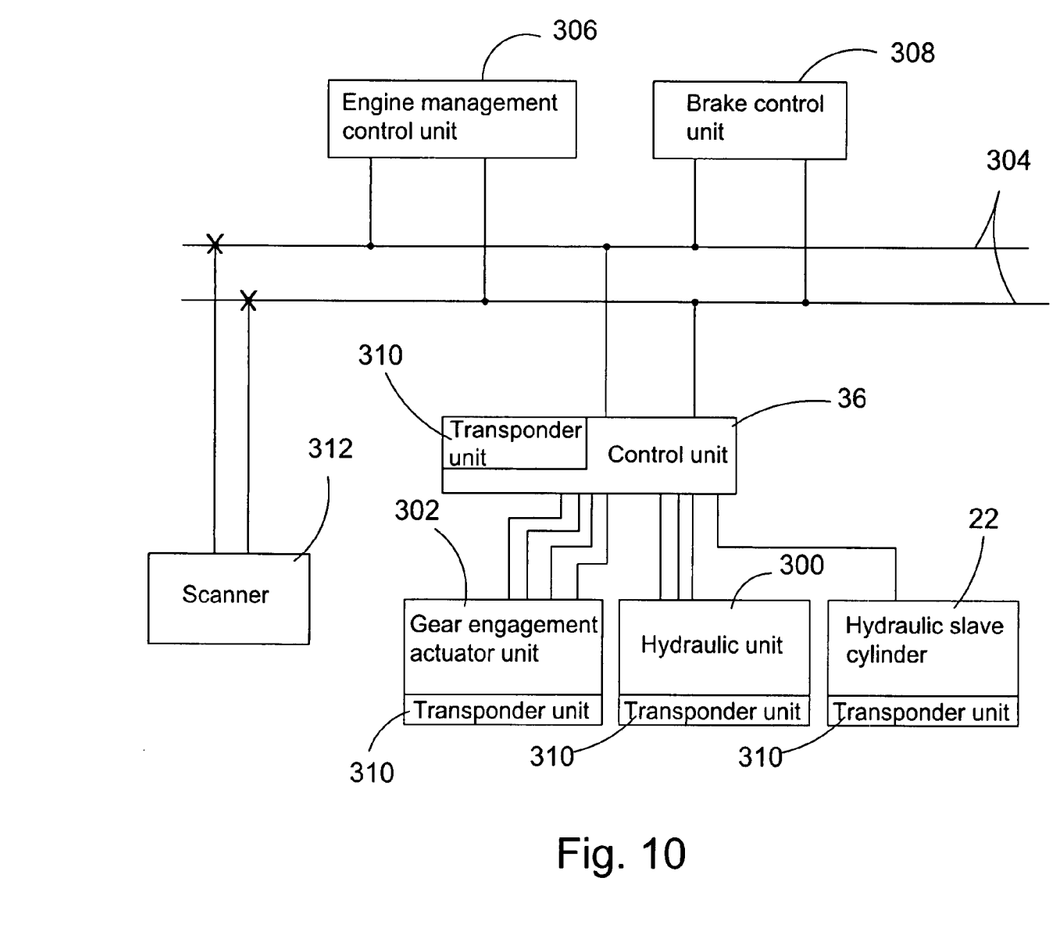
FIG. 10 is a block diagram of the transmission system represented in FIGS. 1 to 9 adapted to be calibrated according to the method of the present invention.

As illustrated in FIG. 10, accumulator 275, equalizing vessel 278, pump 223, check valve 276, pressure relief valve 280 and pressure sensor 282 are typically accommodated together within a common housing as an hydraulic power unit 300, which may be disposed at a distance from the vehicle engine where the environment is less harsh and the components are more accessible. Gear engagement actuators 114, 115 and gear engagement control valves 144, 146 are also typically joined within a common housing as a gear engagement actuator unit 302, which may be attached to transmission 12. Electronic control unit 36 may form a part of the hydraulic power unit or, alternatively, may represent an independent component of the system.

Control unit 36 is electrically connected to hydraulic power unit 300, gear engagement actuator unit 302 and clutch actuator 22, so suitable control signals may be transmitted between the different units and electronic control unit 36 in order to control, for example, the operation of pump 223, main control valve 120 and gear engagement valves 144, 146 and to receive response messages from the different sensors 282, 226, 227 that are associated with components 120, 114, 115.

Furthermore, control unit 36 is also connected via vehicle CAN bus 304 to the electronic control units of other systems of the vehicle, for example, to engine management control unit 306 and brake control unit 308. In this way, electronic control unit 36 is able to transmit signals to engine management control unit 306 in order to control engine speed when starting out from the idle phase and when changing gears and also in order to receive signals from engine management control unit 306, which provides information about the throttle position, engine speed, etc. Electronic control unit 36 may also receive signals from brake management control unit 308 from the wheel speed sensors that are related to the speed of the vehicle.

As illustrated in FIG. 10, each unit 300, 302, 36, 22 that comprises the transmission system has an unpowered, semiconductor-based transponder unit 310, which is embedded in unit 300, 302, 36, 22. Where units 300, 302, 36, 22 have parts that are made out of plastic, for example housings or covers, transponder units 310 may be set into these parts. Alternatively, transponder units 310 may be disposed in recesses that are configured in a housing of components 300, 302, 36, 22 and cast therein using a suitable heat-resistant or chemically resistant mixture.

Transponder units 310 are typically semiconductor components that are connected to an RF antenna and a tuning capacitor and sealed in a capsule. The semiconductor components are able to store an alphanumeric code comprising 10 to 15 positions and respond to a radio signal of a scanner 312 in order to transmit the alphanumeric code that was picked up from scanner 312. When encoding in the hexadecimal system, a ten-place alphanumeric code provides a quantity of 160 bits, and, when encoding using the complete United Kingdom alphabet, there are 360 bits that may be assigned in groups to represent values that corresponds to the varying identification information and operating parameters of various units 300, 302, 36, 22.

For example:

| | | |
|---|---|---|
| Bits | 0–3 | may provide a value that identifies the unit as, for example, a control unit (36), an hydraulic power unit (300) or a gear engagement control unit (302); |
| | 6–4 | the production week number; |
| | 8–7 | weekday; |
| | 12–9 | positions/equipment number ID. |

This information may be used in order to confirm that the correct unit 300, 302, 36, 22 was installed in the system and the unit 300, 302, 36, 22 is an original and not an imitation.

Moreover, the semiconductor component may be encoded with information that relates to the operating parameters of units 300, 302, 36, 22 to which they are attached. While the various units 300, 302, 36, 22 are being produced in order to provide prescribed nominal operating features, these parameters will differ from unit to unit based on manufacturing tolerances. To optimize the operation of the transmission system, it is necessary to measure these parameters and to program control unit 36 with the measured parameters. This can be done at the end of the assembly line when the transmission system has been installed in the vehicle. However, this creates problems related to accuracy and quality control.

Using the method that is covered by the present invention, each unit 300, 302, 36, 22 of the transmission control system may be tested on the test bench after it has been assembled and transponder unit 310 has been encoded with information related to the operating parameters.

For example, for hydraulic power unit 300, transponder unit 310 may be encoded with values that correspond to the following parameters:

| | | |
|---|---|---|
| Bits | 29–13 | Operating pressure of pressure relief valve; |
| | 24–21 | Zero current of the main control valve solenoid; |
| | 28–25 | Minimum charge pressure of the accumulator; |
| | 32–29 | Pressure sensor calibration factor; |
| | 36–33 | Pump capacity; etc. |

In addition to the unit identification and the operating data, when units 300, 302, 36, 22 are installed in the vehicle, transponder units 310 may also be encoded for security purposes with vehicle information data, for example of the VI numbers.

After installation of the various units 300, 302, 36, 22 in a vehicle, transponder units 310 of the various units 300, 302, 36, 22 may be scanned using a hand-held radio scanner 312, which excites transponder units 310 and reads the codes that are transmitted by transponder units 310. This enables accurately checking that the correct units 300, 302, 36, 22 have been installed in the vehicle. Moreover, hand-held radio scanner 312 are connected to vehicle CAN bus 304 so that the critical operating parameters of the various units 300, 302, 36, 22 may be written directly into the electronic control unit 36 via vehicle CAN bus 304.

The method of the present invention in further processing allows effective programming of electronic control unit 36 after the installation of the system in a vehicle or the recalibration of electronic control unit 36 if a unit 300, 302, 36, 22 of the system is replaced during maintenance of the vehicle.

While the invention has been described with reference to a motor vehicle transmission system, the invention is of course applicable to other vehicle systems, which include a number of units, an electronic control unit being among them, and which must be put together to form a system, for example, the engine management control system or brake control system.

The patent claims submitted along with the application are formulation proposals without prejudice for the attainment of further patent protection. The applicant reserves the right to claim additional feature combinations that so far are only disclosed in the description and/or drawings.

References used in the dependent claims point to the further development of the subject matter of the main claim by the features of each dependent claim; they are not to be understood as renunciation of the attainment of a separate, concrete protection for the feature combinations of the referred dependent claims.

Because the subject matter of the dependent claims may form separate and independent inventions with respect to the state of the art on the priority date, the applicant reserves the right to make them the subject matter of independent claims or separation statements. They may furthermore also include independent inventions that have a configuration independent of the subject matter of prior dependent claims.

The exemplary embodiments are not to be understood as a limitation of the invention. Rather, numerous amendments and modifications are possible within the context of the present publication, especially such variants, elements and combinations and/or materials as may be inferred by one skilled in the art with regard to the resolution of the problem using, for example, a combination or modification of individual features or elements or methodological steps that are described in connection with the general description and embodiments as well as the claims and that are contained in the drawings and, using combinable features, lead to a new subject matter or to new methodological steps or methodological sequences, even if they pertain to manufacturing, testing and operating method.

What is claimed is:

1. A method for calibrating a vehicle system comprising multiple interconnected components, an electronic control unit being among them, the method comprising the attachment of an unpowered, semiconductor-based transponder unit that responds to a radio signal to each component of the system, the encoding of the transponder unit with data pertaining to the component, the excitation of the transponder unit using a radio scanner in order to read the data of the transponder unit and the writing of data into the electronic control unit after the component has been installed in the vehicle system.

2. The method as described in claim 1 in which the transponder unit is encoded with data pertaining to: identification of the components, operating parameters of the components, and/or identification of the vehicle in which the component is installed.

3. The method as described in claim 1 in which the transponder unit includes a semiconductor component having an RF antenna and a tuning capacitor.

4. The method as described in claim 3 in which the semiconductor component is programmed with a 10 to 15-place code.

5. The method as described in claim 1 in which said radio scanner is connected to the electronic control unit so that data on the transponder unit may be directly read into the electronic control unit.

6. The method as described in claim 5 in which the radio scanner is connected to the electronic control unit via a vehicle CAN bus.

7. The method as described in claim 1 in which the vehicle system is an automatic transmission system, an engine management control system or a brake control system.

8. A vehicle system comprising multiple interconnected components, among them an electronic control unit, each component including an unpowered, semiconductor-based transponder unit, the transponder unit responding to a radio signal to transmit an encoded signal, the encoded signal representing data pertaining to: identification of the component, operating parameters of the components, and/or identification of the vehicle in which the component is installed, the encoded signal of each transponder unit being readable by means of a radio scanner.

9. The vehicle system as described in claim 8 in which the radio scanner is connected directly to the electronic control unit.

10. The vehicle system as described in claim 8 in which the transponder unit comprises a semiconductor component having an RF antenna and a tuning capacitor.

11. The vehicle system as described in claim 10 in which the semiconductor component is programmed using a 10 to 15-place code.

* * * * *